United States Patent [19]

Kanemitsu et al.

[11] Patent Number: 5,335,997
[45] Date of Patent: Aug. 9, 1994

[54] BAG AND SNAP ZIPPER MADE OF DIFFERENT MATERIALS

[75] Inventors: Toshihiro Kanemitsu, Tokyo; Kaoru Hayashi; Kazufumi Matsui, both of Himeji, all of Japan

[73] Assignee: Idemitsu Petrochemical Co., Ltd., Tokyo, Japan

[21] Appl. No.: 780,376

[22] Filed: Oct. 21, 1991

Related U.S. Application Data

[63] Continuation of Ser. No. 335,051, Apr. 7, 1989, abandoned.

[30] Foreign Application Priority Data

Apr. 7, 1988 [JP] Japan ................... 63-86828
Apr. 7, 1988 [JP] Japan ................... 63-86829
Apr. 7, 1988 [JP] Japan ................... 63-86830
Apr. 21, 1988 [JP] Japan ................... 63-99973

[51] Int. Cl.⁵ ............................. B65D 33/16
[52] U.S. Cl. ............................. 383/63; 383/113
[58] Field of Search ......................... 383/63, 113

[56] References Cited

U.S. PATENT DOCUMENTS

| | | |
|---|---|---|
| 4,430,070 | 2/1984 | Ausnit . |
| 4,561,108 | 12/1985 | Kamp ................... 383/65 |
| 4,601,694 | 7/1986 | Ausnit . |
| 4,673,383 | 6/1987 | Bentsen . |
| 4,709,533 | 12/1987 | Ausnit . |
| 4,922,588 | 5/1990 | Borchardt et al. ........ 24/576 |
| 4,925,318 | 5/1990 | Sorensen ................ 383/63 |

FOREIGN PATENT DOCUMENTS

0023817 2/1981 European Pat. Off. .

OTHER PUBLICATIONS

"Principles of Package Development" by Roger C. Griffin and Stanley Sacharow published in 1972 by the AVI Publishing Co. Inc., Westport Conn. p. 44.

Primary Examiner—Stephen P. Garbe
Attorney, Agent, or Firm—Flynn, Thiel, Boutell & Tanis

[57] ABSTRACT

This invention relates to a snap zipper, a bag with a snap zipper, manufacture method and apparatus for a bag with a snap zipper, and bagging method and apparatus for a bag with a snap zipper. A hot-welded portion of the snap zipper comprising a male member and a female member is formed of ionomer resin or random copolymer resin of ethylene - acrylic acid. At least one tape with a pair of snap zipper half-members and a base film are supplied and passed through guide rollers for being placed one above the other, followed by hot-welding the tapes with snap zipper half-members and the base film to each other to form a film with a snap zipper. The film with a snap zipper is guided by a guide member such that the pair of snap zipper half-member are intermeshed to form a tubular film. The tubular film is sealed off with intervals of a predetermined distance perpendicularly to the lengthwise direction thereof. A desired packed material is then supplied into the tubular film sealed at the bottom end through an opening which is defined in forming the tubular film. The resulting bag can be opened by tearing the end of the bag by hands along a cut-line formed on the opening side relative to the snap zipper.

8 Claims, 12 Drawing Sheets

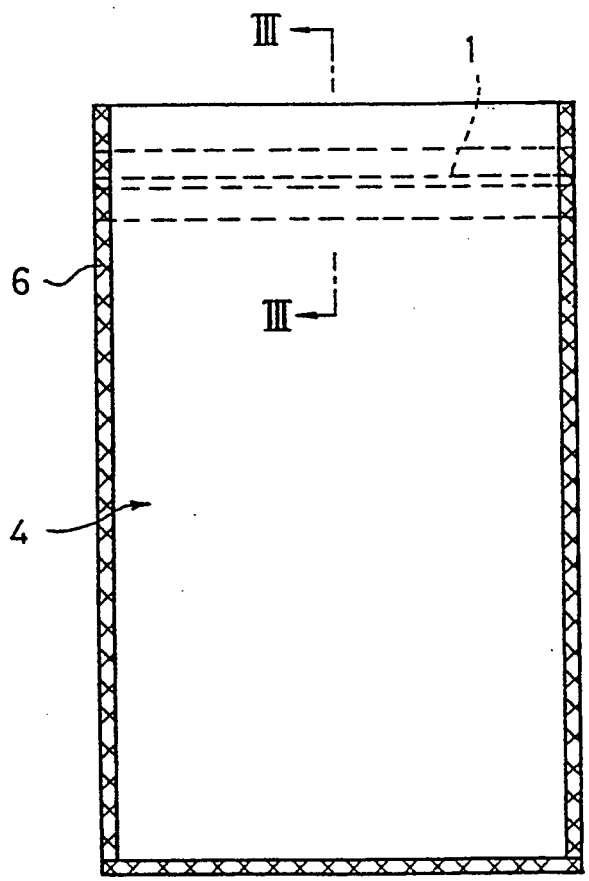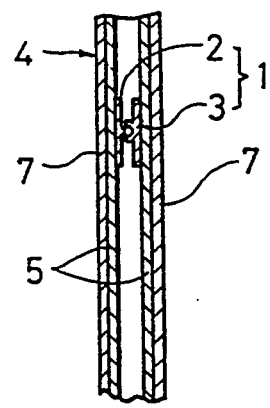

BAG AND SNAP ZIPPER MADE OF DIFFERENT MATERIALS

This application is a continuation of U.S. Ser. No. 07/335,051, filed Apr. 7, 1989, now abandoned.

FIELD OF THE INVENTION

This invention relates to a snap zipper, a bag with a snap zipper, manufacture method and apparatus for a bag with a snap zipper, and bagging method and apparatus for a bag with a snap zipper, utilizable in the field of packing commodities, such as foodstuffs and pharmaceuticals, which should be kept in a moistureproof, deoxidized, or other desired state, and also which require resealing after opening.

DESCRIPTION OF THE RELATED ART

Background of the Invention

In a variety of fields of foodstuffs, pharmaceuticals, miscellaneous goods and so on, there have been widely employed bags (or bags with snap zippers) which can be opened and closed optionally with belt-like snap zippers (fasteners), each comprising a pair of male and female portions, provided in opening regions of the bags. Various methods of manufacturing such bags with snap zippers have been proposed. For example, there are known methods of; (1) extruding a tubular film together with a snap zipper, comprising a pair of male and female portions, through an extrusion die; and (2) manufacturing a tape with a snap zipper in advance and then bonding the tape to a base film, which forms a bag body, by hot welding (melting for adhesion) or an adhesive. See Japanese Patent Laid-Open No. 56-42640, No. 61-231220, No. 61-232111, No. 61-232112, No. 63-232114 and No. 63-42849, and Japanese Patent Publication No. 62-40185, for example.

However, the former method (1) is restricted in its application to only common versatile products consumed in large quantities for the reasons of a limitation in the sorts of usable resin, difficulty in application to a base film of the multilayer type, lack of adaptability to various sizes, and difficulty in printing, etc. Therefore, the latter method (2) has been employed, particularly, in the field of packing high-class goods by taking advantage of its flexible adaptation to versatile combinations of tapes with snap zippers and base films. But, such tapes with snap zippers can be applied to those base films formed of similar type resin alone, and materials currently used for the tapes with snap zippers are only low-density polyethylene (LDPE), polypropylene (PP), polyvinyl chloride (PVC), etc. Thus, the latter method (2) also has a disadvantage in that it is not adapted for bag bodies formed of metal foils which are frequently being employed these days, some limitation is experienced in the actual combination of materials selected, and hence the method cannot always be applied to all sorts of base films.

In order to improve the hot-melting adhesion, therefore, it has further been proposed to use mixed resin of crystalline propylene copolymer (Japanese Patent Laid-Open No. 59-49249), and to use a multilayered snap zipper (Japanese Patent Publication No. 51-43054).

Because of a reduction in the hot-welding temperature, such improved snap zippers are effective, for example, in preventing deformation of the snap zippers and restraining the occurrence of failed appearance of the hot-welded portions to some extent. However, those snap zippers present no basic solution to the problem inasmuch as they will not allow free selection of all sorts of materials.

Furthermore, the following drawbacks are associated with use of higher-temperature fusible resin such as polypropylene; a. poor hot-melting adhesion, b. difficulty in continuous process and reduction in the manufacture speed (because the need of both hot pressing and cooling necessitates a batch process in practice); c. adverse effects due to heat exerted on base films and snap zippers (i.e., edge drop, deformation of snap zippers, occurrence of pin holes, etc.); and d. difficulty in achieving the small size of the manufacture apparatus. In addition, the bonding method using an adhesive accompanies problems below; e. complicated process; f. need of a specific adhesive; g. insufficient adhesion in the case of employing such materials as ill compatible with the adhesive used; and h. contamination and hygienic trouble due to outward spread of the adhesive.

Meanwhile, conventional bags with snap zippers are completely enclosed by their sealed ends before opening, and are cut in regions between the snap zippers and the sealed ends when used, followed by opening the snap zippers. Such cutting has hitherto been made by using scissors, or tearing the bag by hands from a notch formed on the side edge of the region to be cut. However, the latter cutting method has a disadvantage that the bag cannot be torn neatly along a straight line.

For the above reason, there are proposed several methods capable of linearly tearing the bags by hands without using any tools such as scissors. Included in these methods are, for example, the techniques of; i) forming a perforated line as a tear line; ii) making thicker an outerside portion of an innerside film where a snap zipper is formed, forming a cut-out line in that thicker portion, and then laminating an outerside film on the innerside film to thereby fabricate a bag with a snap zipper (see Japanese Utility Model Laid-Open No. 52-18254); iii) forming a non-hot melting layer on the innerside of a film in the region near a snap zipper, where a cut line is to be formed, and carrying out hot welding through the non-hot melting layer in a perforation manner to thereby fabricate a bag with a snap zipper (see Japanese Patent laid-Open No. 58-171347); iv) forming a recessed cut-out portion 70, which extends to the base film 10, in a tape 13 having a snap zipper thereon, as shown in FIG. 21; and v) forming a half cut-out portion 70 in a tape 13 having a snap zipper thereon, as shown in FIG. 22.

Among the conventional methods of manufacturing bags with snap zippers as set forth above, the method i) of forming a perforated line makes the bag less airtight due to the presence of perforations, and may open the bag for some reason during transportation or other situations where it should be kept in a sealed state. The method ii) of forming a cut-out line in the innerside film in advance and then laminating an outerside film on the innerside film enables the innerside film formed with the cut-out line to be torn neatly, if it is left alone, i.e., before lamination. But, after bonding the innerside film to the base film by hot melting, there is a fear that the cut-out line may be filled with the melted resin upon application of heat and the bag may become hard to tear open along the cut-out line. The method iii) of forming a cut line by hot-welding in a perforation manner can improve the sealability to some extent, but still has disadvantages that the sealability is not perfect and the process is complicated. The method iv) of forming a recessed cut-out portion has disadvantages that the torn line tends to curve unintentionally rather than a neat linear one, and a tape separate from the tape with a snap zipper requires to be hot-welded. The final method v) has disadvantages that the torn line also tends to curve unintentionally rather than a neat linear one, and the tape has a large width, variations in thickness and a tendency to curl in the widthwise direction, which invites some difficulty in the melting operation.

Further, since the bag fabricating process and the bagging process have been separately treated in the prior methods, it is inevitable for the entire packing process to be complicated, have a low efficiency because of difficulties in accomplishing continuous and automatic processing, and to be unsuitable for bagging and packing of products in mass production. As a method of solving that problem, therefore, there has also been proposed a so-called pillow packing that is intended to perform both the bag fabrication process and the bagging process simultaneously.

However, the foregoing prior methods of manufacturing and filling bags with snap zippers, even in the case of employing the pillow packing, could not avoid the problems. a–h as stated above, because films with snap zippers have been obtained through bonding by hot melting or using an adhesive with any of a number methods.

SUMMARY OF THE INVENTION

A first object of the present invention is to provide a snap zipper which has good hot-melting adhesion with respect to a variety of base films, and a bag having a snap zipper hot-welded to a base film, which can be applied to the field of special packing as well.

A second object of the present invention is to provide a method of manufacture and an apparatus for making a bag with a snap zipper, which facilitates a continuous bonding of the snap zipper with good adhesion and also an improvement in productivity.

A third object of the present invention is to provide a method and an apparatus for fabricating and filling a bag with a snap zipper, which enhances the bagging and packing speed.

A fourth object of the present invention is to provide a method of manufacture and an apparatus for making a bag with a snap zipper, which facilitates keeping the bag in a completely sealed state and allowing the bag to open easily by hand without needing special steps.

The snap zipper according to the present invention has its hot-welded portion secured to a bag body, which portion is preferably formed of at least ionomer resin or random copolymer resin of ethylene - acrylic acid. The bag with a snap zipper according to the present invention is preferably manufactured by hot-welding a snap zipper comprising a pair of intermeshing half-members to a bag body and then fabricating it into a bag, the snap zipper having a hot-welded portion secured to the bag body, which portion is formed of at least ionomer resin or random copolymer resin of ethylene - acrylic acid.

The ionomer resin includes, though not particularly so limited, random copolymer, block copolymer or graft copolymer of $\alpha$-olefin, such as ethylene or propylene, and $\alpha, \beta$-unsaturated carboxylic acid or derivatives thereof, with metallic ions added thereto, for example. One example of copolymerization ratios is given by 99.9–80.0 mol % of $\alpha$-olefin and 0.1–20.0 mol % of $\alpha,\beta$-unsaturated carboxylic acid or derivatives thereof.

Above all, a preferable one is ethylene ionomer resin comprising a copolymer of ethylene and unsaturated carboxylic acid (methacrylic acid), and metallic ions of 1-3 valence added thereto. Metallic ions of 1-3 valence include $Na^+$, $K^+$, $Zn^{++}$, $Al^{+++}$, etc., for example. The unsaturated carboxylic acid or derivatives thereof include unsaturated mono- or di-carboxylic acid such as acrylic acid, methacrylic acid, maleic acid, fumaric acid, etc., or amide, ester, metallic salt or acid anhydride thereof, and it may be used singularly or in the mixed form consisted of two or more components. The commercialized usable ionomer resin includes SURLYN (TM) by dupont Company, HI-MILAN (TM) by Mitsui - dupont Chemicals Company, etc.

The ionomer resin is selected to have a melting index (MI) in a range of 0.5–2.0 g/10 minutes, preferably 1–10 g/10 minutes, and a density in a range of 0.935–0.97 $g/cm^3$. Preferable metallic ones are $Na^+$ and $Zn^{++}$.

The random copolymer resin of ethylene - acrylic acid employed in the present invention includes, though not particularly so limited, ethylene - methacrylic acid random copolymer (EMAA), ethylene - methyl acrylate random copolymer (EMA), ethylene - ethyl acrylate random copolymer (EEA), ethylene - methyl methacrylate random copolymer (EMMA), and ethylene - acrylic acid random copolymer (EAA), for example. Above all, ethylene - methacrylic acid random copolymer and ethylene - methyl acrylate random copolymer are preferable.

The random copolymer resin of ethylene - acrylic acid is selected to have a melting index (MI) in a range of 2.5–20 g/10 minutes, preferably 5–15 g/10 minutes, and a density in a range of 0.920–0.955 $g/cm^3$. Where the melting index is otherwise than the above range, integrity in shape of the molded products is impaired and hence fitness of the resulting snap zippers becomes poor.

Further, the method of manufacture of a bag with a snap zipper according to the present invention includes the steps of fabricating a film with a snap zipper by hot-welding a base film and one or two tapes with a pair of snap zipper half-members capable of intermeshing under ultrasonic energy, while continuously running the base film and the tapes with snap zipper half-members lying one above the other; and fabricating the film with a snap zipper into a bag.

The apparatus for manufacturing a bag with a snap zipper according to the present invention preferably includes supply means for a base film; supply means for one or more tapes with at least one pair of snap zipper half-members capable of inter-meshing; guide means for continuously running the base film and the tapes with snap zipper half-members while placing the base film and the tapes one above the other; at least one ultrasonic welder for hot-welding the base film and the tapes with snap zipper half-members to each other, and means for intermeshing the pair of snap zipper half-members.

In the apparatus for manufacturing a bag with a snap zipper, the ultrasonic welder includes an ultrasonic horn and an anvil, and one of the contact portions of the horn and anvil is preferably a surface curved in the running direction of the base film. The anvil is a cylinder, more preferably a rotatable cylinder.

The method of fabricating and filling a bag with a snap zipper thereon according to the present invention is featured by the steps of preparing a film with a snap zipper by hot-welding a base film and one or more tapes with at least one pair of snap zipper half-members capable of intermeshing under ultrasonic energy, while continuously running the base film and the tapes with snap zipper half-members lying one above the other; intermeshing the pair of snap zipper half-members to form the film with a snap zipper into a tubular configuration; and forming sealed portions in the tubular film with intervals of a predetermined distance in the lengthwise direction thereof to fabricate the tubular film into separate bags, and filling a packed material into each bag.

The apparatus for fabricating and filling a bag with a snap zipper thereon is featured in the provision of supply means for a base film; supply means for one or more tapes with at least one pair of snap zipper half-members capable of inter-meshing; guide means for continuously running the base film and the tapes with snap zipper half-members while placing the base film and the tapes one above the other; at least one ultrasonic welder for hot-welding the base film and the tapes with snap zipper half-members to each other; means for intermeshing the pair of snap zipper half-member to form a tubular form; sealing means located to extend perpendicular to the lengthwise direction of the tubular film; and packed material supply means for supplying a packed material into said tubular film.

BRIEF DESCRIPTION OF THE DRAWINGS

FIG. 2 is a plan view showing the entire configuration of the bag with a snap zipper;

FIG. 3 is an enlarged sectional view taken along line III—III in FIG. 2;

DETAILED DESCRIPTION OF THE PREFERRED EMBODIMENTS

Hereinafter, preferred embodiments of the present invention will be described in detail with reference to the drawings.

Figure 1A:
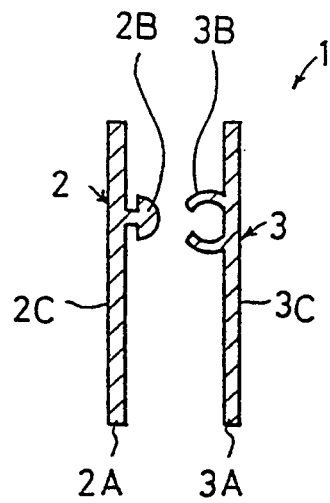
FIG. 1(A) is a fragmentary sectional view of essential parts showing one embodiment of a snap zipper according to the present invention.

In FIG. 1(A) which illustrates one embodiment of a snap zipper according to the present invention, a snap zipper 1 comprises a snap zipper's male half-member 2 having a male portion 2B projected on one side of an elongate sheet-like film 2A to extend in the lengthwise direction of the film, and a snap zipper's female half-member 3 corresponding to the snap zipper's male half-member 2 and having a female portion 3B formed on one side of another sheet-like film 3A. The opposite sides of the sheet-like films 2A and 3A, on which the male and female portions 2B, 3B are not formed, serve as hot-welded portions 2C, 3C to films for constituting a bag body 4 (see FIG. 1(B)).

Figure 1B:
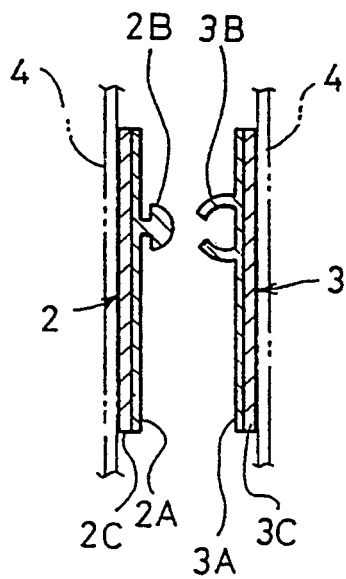
FIG. 1(B) is a fragmentary sectional view of essential parts of a bag with a snap zipper.

In this embodiment, the male and female half-members 2, 3 of the snap zipper are formed of ionomer resin or random copolymer resin of ethylene - acrylic acid. Alternatively, as shown in FIG. 1(B), the male and female half-members 2, 3 of the snap zipper may be each composed of two layers to have the hot-welded portions 2C, 3C as separate layers. Only the hot-welded portions 2C, 3C may be formed of ionomer resin or random copolymer resin of ethylene - acrylic acid, and the remaining portions may be formed of any other kinds of resin. Here, the different kinds of resin include low-density polyethylene, ethylene - vinyl acetate copolymer, ethylene - acrylic acid copolymer, low-crystalline ethylene - α- olefin copolymer, and any one of these with an added elastomer or the like. Such multilayered structure comprising ionomer resin or random copolymer resin of ethylene - acrylic acid and a different kind of resin facilitates a proper adjustment of the intermeshing strength, openability and other properties of the snap zipper 1.

At this time, the ionomer resin or random copolymer resin of ethylene - acrylic acid and the different sort of resin may be added, as required, with polyolefin denaturated by unsaturated carboxylic acid or derivatives thereof, or a mixture of the denaturated polyolefin and non-denaturated polyolefin. The denaturated polyolefin includes, though not particularly so limited, propylene copolymer, ethylene copolymer, etc.

The unsaturated carboxylic acid includes acrylic acid, methacrylic acid, maleic acid, fumaric acid, itaconic acid, crotonic acid, citraconic acid, sorbic acid, mesaconic acid, angelic acid, etc. The derivatives thereof include acid anhydride, ester, amide, imide, metallic salt, etc. For example, there are maleic acid anhydride, itaconic acid anhydride, citraconic acid anhydride, methyl acrylate, methyl methacrylate, ethyl acrylate, butyl acrylate, monoethyl maleate ester, acryl amide, maleic monoamide, maleimide, N-butyl maleimide, sodium acrylate, sodium methacrylate, etc.

Denaturation of polyolefin by the unsaturated carboxylic acid or derivatives thereof is not particularly limited in its method, and can be performed using any of many various known methods. For example, polyolefin and maleic acid anhydride or the like are mixed and added with a radial polymerization starter under the presence or absence of a solvent, followed by heating it. The reaction may be carried out under coexistence of another vinylmonomer such as styrene, or a rubber material such as liquid rubber or thermoplastic rubber.

The content of the unsaturated carboxylic acid or derivatives thereof contained in the resulting denaturated polyolefin is selected to be normally in a range of 0.001–15 wt %, preferably 0.005–10 wt %.

Incidentally, the mixing ratio of the denaturated polyolefin is selected to be in order of 0.01–20 wt %.

Though not particularly so limited, the manufacture method of the snap zipper formed of ionomer resin or random copolymer resin of ethylene - acrylic acid according to this embodiment can usually be practiced by carrying out extrusion molding, such as single extrusion or coextrusion, using one or more extrusion dies which have their sectional shapes similar to those of the paired snap zipper's half-members, and then cooling the molded product in water for solidification.

In addition, the configuration of the snap zipper is not limited to the type having male and female portions fitted to each other, and may be any desired one of the known configurations so long as it allows the snap zipper to be opened and closed optionally.

According to one embodiment of the bag with a snap zipper of the present invention, as shown in FIGS. 2 and 3, the bag can be obtained by hot-welding the snap zipper 1 to base films 5, which form the bag body 4, by any of the known means such as heat, high-frequency waves or ultrasonic waves, and then sealing peripheral edge 6. At this time, the base films 5 may be of a multi-layered material having, for example, a laminated metallic foil 7 such as aluminum foil.

Though not particularly so limited, used as the base film 5 is a singly-layer film, multilayered film, laminated film, etc. The laminated multilayer film comprises, for example, a composite film consisted of ethylene - vinyl alcohol copolymer, polyvinylidene chloride, polyacrylonitrile, polyamide, or metal such as aluminum, all of which have the gas barrier property, and a different sort of film. Further, a multilayered material comprising another type of material such as paper or non-woven fabric may be employed instead. Any of these multilayered film and material may comprise three or more different materials laminated one above another taking into account the articles to be packed.

In this connection, the layer forming the innerside of the bag body 4, onto which the snap zipper 1 is to be hot-welded, is formed of low-density polyethylene, ethylene - vinylacetate copolymer, ionomer resin, or random copolymer resin of ethylene - acrylic acid, above all preferably ionomer resin or random copolymer resin of ethylene - acrylic acid. Thus, the ionomer resin and random copolymer resin of ethylene - acrylic acid are superior in cold-sealability, hot-sealability, oil resistance and pin-hole resistance, and has good adhesion with aluminum. So they are suitable to fabricate a packing bag which has an aluminum layer.

The packing bag with the snap zipper of the present invention can be hot-welded at a lower temperature, has the high-hot-melting adhesion, and allows the hot-welding operation to be carried out efficiently and steadily.

Experiment 1

The snap zipper 1 shown in FIG. 1(A) was obtained by extrusion-molding ionomer resin (MI: 5 g/10 minutes density: 0.94 g/cm$^3$ HI-MILAN (TM) AM-6001 by Mitsui - dupont Chemicals Company), and then cooling the molded product in water.

Then, the resulting tape with the snap zipper was hot-welded to the base films 5 which form the bag body 4 and comprise each a multilayered material consisting of aluminum/-ionomer resin (20 μm/20 μm), thereby obtaining the bag with a snap zipper as shown in FIGS. 2 and 3. This bag could be hot-welded easily, and exhibited the very strong hot-melting adhesion. Further, the snap zipper had good openability, resealability and appearance.

Experiment 2

The snap zipper 1 shown in FIG. 1(A) was obtained by extrusion-molding random copolymer resin of ethylene - acrylic acid (MI: 5 g/10 minutes, density: 0.94 g/cm$^3$, NUCREL (TM) AN4203-2 by Mitsui - dupont Chemicals Company), and then cooling the molded product in water.

Then, the resulting tape with the snap zipper was hot-welded to the base films 5 which form the bag body 4 and comprise each a multilayered material consisting of aluminum/random copolymer resin of ethylene - acrylic acid (20 μm/20 μm), thereby obtaining the bag with a snap zipper as shown in FIGS. 2 and 3. This bag could be hot-welded easily, and exhibited the very strong hot-melting adhesion. Further, the snap zipper had good openability, resealability and appearance.

The following Table shows the properties of various embodiments of the present invention and comparative examples.

TABLE

| SAMPLE | MI (g/10 min) | DENSITY (g/cm$^3$) | INTEGRITY OF SHAPE | FITNESS | SEALING TEMP. (°C.) |
|---|---|---|---|---|---|
| EMBODIMENTS | | | | | |
| EMMA | 3.0 | 0.92 | Δ | Δ | 124 |
| " | 8.0 | 0.94 | ◯ | ◯ | 120 |
| " | 10.0 | 0.93 | ◯ | ◯ | 120 |
| " | 14.0 | 0.94 | ◯ | ◯ | 119 |
| EMA | 5.0 | 0.94 | ◯ | ◯ | 123 |
| " | 6.0 | 0.94 | ◯ | ◯ | 123 |
| " | 17.0 | 0.94 | ◯ | ◯ | 118 |
| COMPARA. EX. | | | | | |
| EMAA | 27.0 | 0.93 | X | X | 118 |
| EMA | 1.5 | 0.94 | X | X | 123 |
| " | 25.0 | 0.94 | X | X | 118 |

TABLE-continued

| SAMPLE | MI (g/10 min) | DENSITY (g/cm³) | INTEGRITY OF SHAPE | FITNESS | SEALING TEMP. (°C.) |
|---|---|---|---|---|---|
| LDPE | 1.0 | 0.91 | ◯ | ◯ | 140 |

[Note]
*1 . . . In the column of "Integrity of Shape", the mark ◯ indicates that snap zipper whose half-members have a predetermined shape, Δ indicates that the half-member's shape is close to a predetermined one, and X indicates the half-member's shape is far from a predetermined one.
*2 . . . In the column of "Fitness", the mark ◯ indicates that the male and female portions can easily be fitted to each other, Δ indicates that they are hard to fit to each other, and X indicates they would not fit to each other.
*3 . . . In the column of "Sealing Temperature" indicates the setting temperature of a bag manufacture machine equipped with a chuck.
*4 . . . EMA: Trade Mark by CHEVRON Company/"POLY-ETH" MI: 6.0, D (density) = 0.94.

The snap zipper according to the present invention has proper and steady extrudability, stability in shape and intermeshing strength, and also exhibits high hot-melting adhesion with the base film which forms the bag body, particularly, such base film as having its innerside layer formed of ionomer resin or random co-polymer resin of ethylene - acrylic acid that has good sealing capability.

Further, the bag with the above snap zipper can present complete hot-melting adhesion to ionomer resin or random copolymer resin of ethylene - acrylic acid, that has been found difficult in hot-welding with the conventional snap zippers formed of polyethylene or ethylene - vinyl acetate copolymer, thereby making it possible to provide the packing bag which includes an aluminum layer and hence has the high gas barrier property. The present bag also exhibits good hot-melting adhesion to low-density polyethylene.

Accordingly, the present bag is suitable for packing foodstuffs, pharmaceuticals, adhesive medicines (poultices), etc. as well as resealing them after once opening the bag, while achieving various specific packings such as moistureproof packing, deoxidation packing and anti-drying packing, and hence it has a very high practical value.

Figure 4:
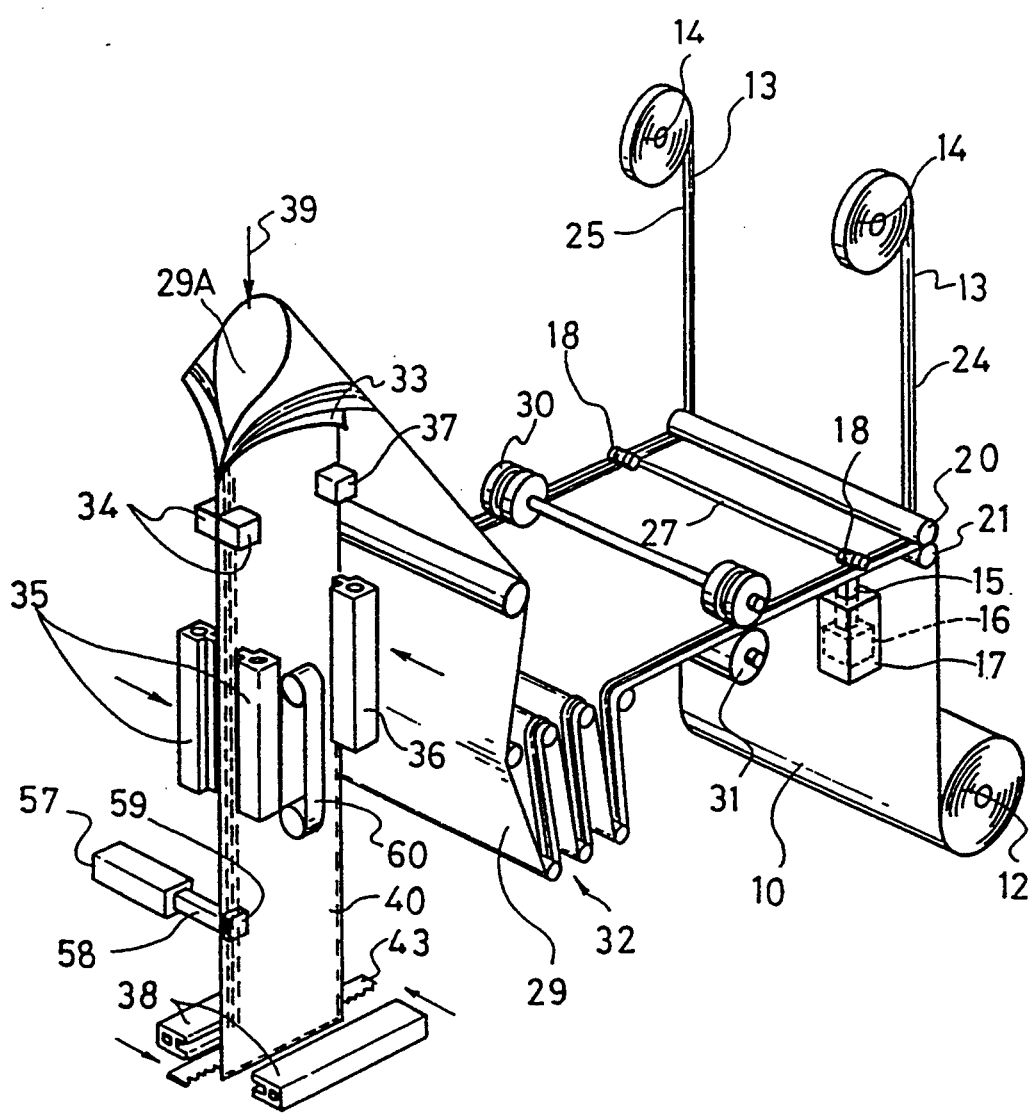
FIG. 4 is a general constructional view schematically showing respective components to explain an apparatus in which are incorporated a method of manufacturing the bag with a snap zipper, and a method of continuously manufacturing and filling the bag according to the present invention.
Figure 5:
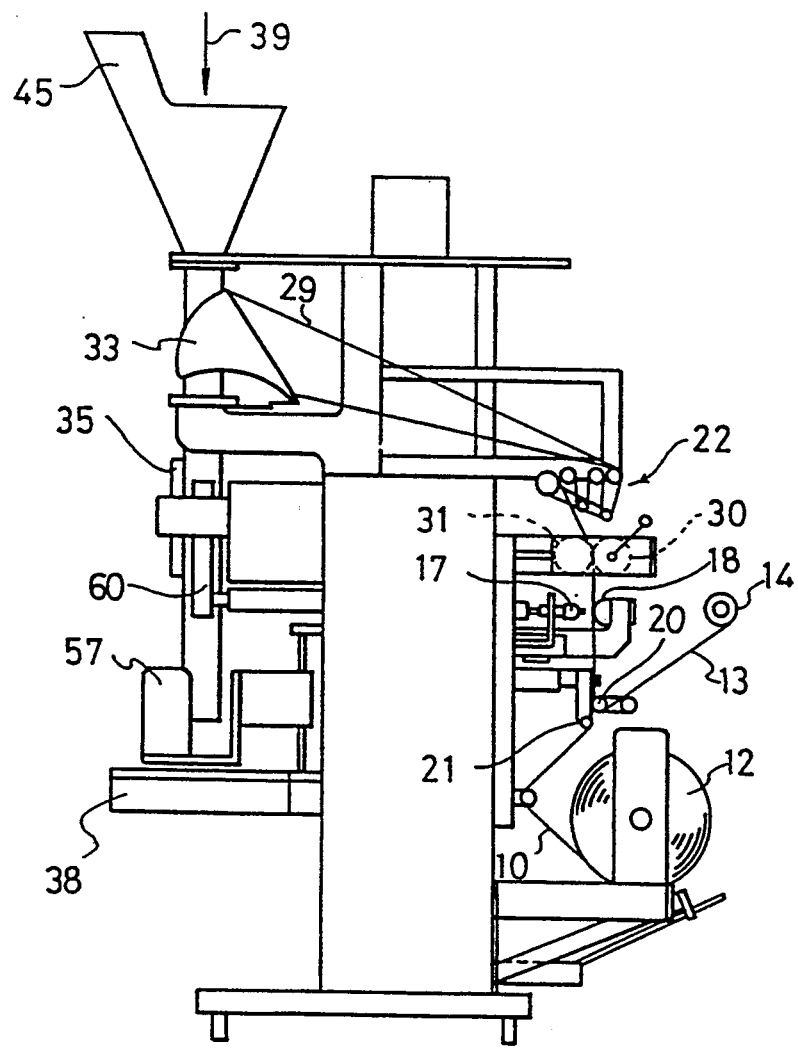
FIG. 5 is a general front view showing the entire construction of the apparatus of FIG. 4.
Figure 6:
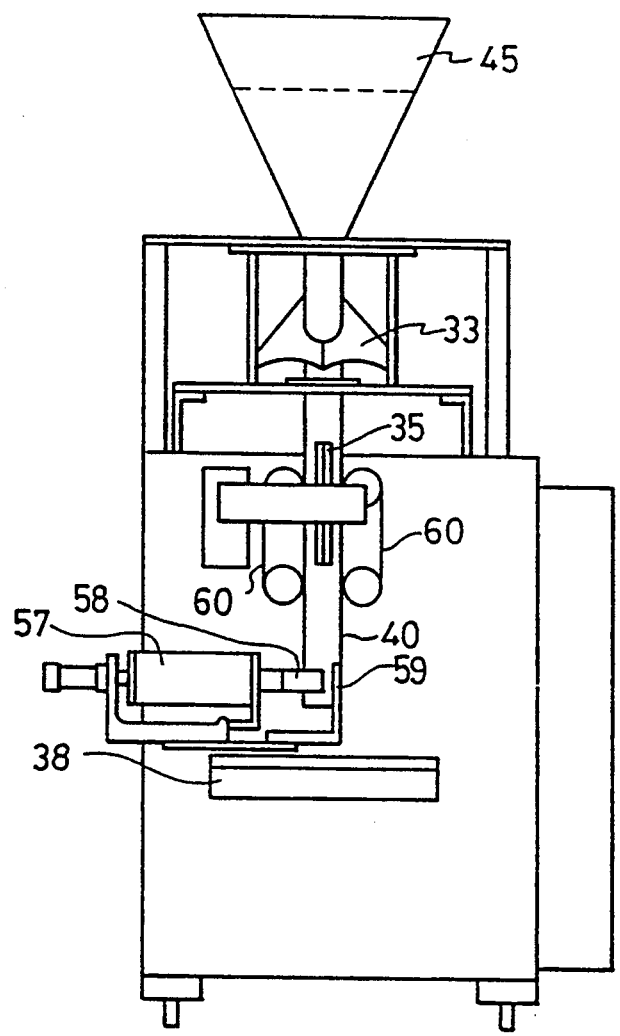
FIG. 6 is a side view of FIG. 5.
Figure 7:
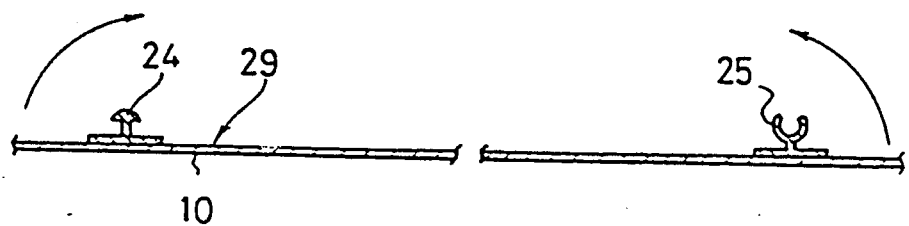
FIG. 7 is a sectional view showing the state before fabricating into the bag where the snap zipper is provided on a base film.

FIGS. 4–6 show one embodiment of an apparatus in which are incorporated the method of manufacturing the bag with a snap zipper and the method of continuously carrying out the bag fabricating process and the bagging process according to the second and third embodiments, respectively.

Here, it is to be noted that respective corresponding components in FIGS. 3, 5 and 6 are not always in match with each other in a shape and arrangement and, especially, those components in FIG. 4 are somewhat modified in a shape and arrangement for convenience of understanding. But, because of no significant difference in practice, the corresponding components are denoted by the same reference numerals throughout the Figures.

To obtain a film 29 with a snap zipper as a first step, as shown in FIGS. 4 to 6, the present apparatus includes base film supply means 12 for supplying a base film 10 wound into a roll, a pair of supply means 14 of tapes with snap zipper half-members for supplying two tapes 13 formed with a male portion 24 and a female portion 25, respectively, and wound into separate rolls, a pair of guide rollers 20, 21 as guide means for continuously running the base film 10 and the tapes 13 with snap zipper half-members one above the other, a pair of ultrasonic welders 17, each of which comprises a ultrasonic oscillator 16, ultrasonic horn 15 and an anvil 18 for receiving ultrasonic energy and which are located corresponding to the respective tapes 13, and a pair of driver and driven rollers 31, 30.

In the above arrangement, the ultrasonic welders 17 and the driven roller 30 are movable along the width of the base film 10 such that their mounting positions in the widthwise direction of the base film 10 can be changed dependent on the size of the base film 10 and the positions where the tapes with snap zipper half-members are to be hot-welded.

Next, to continuously obtain the film 29 with a snap zipper and intermittently carry out fabrication of the bag and then bagging, the present apparatus also includes a set of plural dancer rollers 32, a tubular film forming member (former) 33 having a guide surface adapted to fold the film 29 with a snap zipper into a tubular film 40, a pair of presser members 34 for pressing the film 10 to each other for intermeshing the male portion 24 and the female portions 25, two pairs of hot-press sealing bars 35, 36 located near the opposite side ends of the film 29 with a snap zipper running vertically to seal the respective lengthwise side edges of the tubular film 40, a pair of presser members 37 located above one pair of sealing bars 36 to give a fold to one side edge of the tubular film 40, a ultrasonic welder 57 comprising a ultrasonic horn 58 and an anvil 59 located opposite to the horn 58 with the tubular film 40 therebetween, the ultrasonic horn 58 being provided to collapse or crash a portion of the tapes 13 with snap zipper half-members corresponding to a horizontal seal, as later described, and movable toward and away from the tubular film 40, a pair of sealing bars 38 located to extend along the width of the tubular film 40, and a cutter 43, all of these components being arranged in the direction of advancement of the film 29 with a snap zipper and the tubular film 40 in due order. Above the tubular film 40, there is provided, as packed material supply means, a hopper 45 for supplying a packed material 39 fed from a feed conveyer (not shown) into the tubular film 40. To this end, the tape 29 with a snap zipper is so folded by the tubular film forming member 33 as to define an opening 29A through which the packed material is supplied. There is also provided a pair of endless belt type feed mechanisms 60 located each on either side of the tubular film 40 in opposite relation with respect to the film plane for transferring the tubular film 40 in the lengthwise direction thereof.

Figure 8:
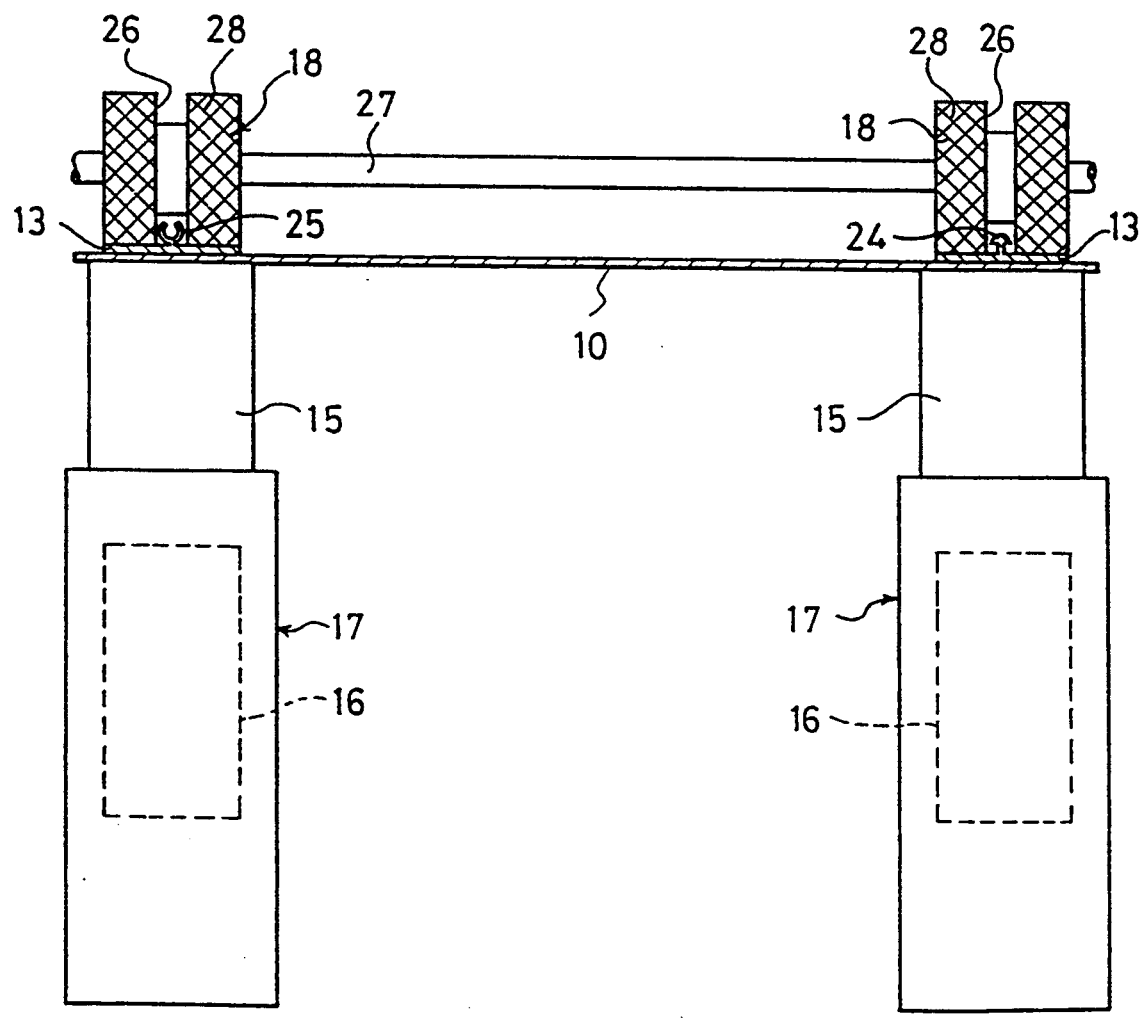
FIG. 8 is an enlarged view showing a section in which a ultrasonic welder is located.

As shown in FIG. 8, each anvil 18 for hot-welding the tape with a snap zipper half-member has a groove 26 at a part corresponding to the male portion 24 (or the female portion 25), but has a substantially cylindrical outer shape as a whole. The anvil 18 is mounted on a support member 27 rotatably about its axis, and has outer peripheral knurled surfaces 28 in the form of rhombic patterns, strip patterns in the axial direction, or strip patterns in the circumferential direction, as required. The knurled surfaces 28 serve to prevent a relative positional displacement between the anvil 18 and the tape 13, and keep the hot-welded portions from being contracted, thereby ensuring a good appearance.

In this embodiment too, the configuration of the snap zipper is not limited to the illustrated one, and may be modified to any of other configurations so long as it can provide the same function.

According to this embodiment, the bag with a snap zipper is manufactured and filled with the packed material as follows.

More specifically, the base film 10 fed from the base film supply means 12 and the tapes 13 with snap zipper half-members fed from the supply means 14 of the tape with snap zipper half-members are passed between the pair of guide rollers 20 and 21 opposite to each other, so that they are placed one above the other while being pressed. The base film 10 and the tape 13 thus laminated continue to run for being passed between the ultrasonic horn 15 and the anvil 18 located opposite to the horn 15. At a position of the ultrasonic horn 15, the base film 10 and the tape 13 with snap zipper half-members are hot-welded to each other under ultrasonic energy oscillated from the ultrasonic oscillator 16, thereby obtaining the film 29 with a snap zipper. For positive ultrasonic welding, the ultrasonic welder 17 is so set as to irradiate enough ultrasonic energy to hot-weld the base film 10 and the tape 13 with snap zipper half-members lying one above the other during the time they pass the distal end of the ultrasonic horn 15 while continuing its run.

Then, after passing between driver and driven rollers 30, 31, the film 29 with a snap zipper is sent to the subsequent bag fabricating process and the bagging process through the set of plural dancer rollers 32.

More specifically, the film 29 with a snap zipper is guided along the guide surface of the tubular film forming member 33 so that the film 29 is folded at the center, followed by intermeshing the male and female portion 24, 25 to each other by the pair of presser members 34 for forming the tubular film 40. Then, after pressing both the side edges of the tubular film 40 by the pair of presser members 34 and another pair of presser members 37 provided on the opposite side, the tubular film 40 is intermittently transferred through the feed mechanisms 60 to the sealing bars 35, 36, located just below the presser members 34, 37, where the opposite side edges of the tubular film 40 over a region corresponding to one bag are sealed by hot pressing. Although it is not necessarily be required to seal the side edge of the tubular film 40 on the side opposite to the snap zipper side, sealing that side edge leads to an advantage that the folded line appears clear and the appearance is bettered. Note that the difference in feed rate caused by the continuous feed of the base film 10 and tape 13 by the driver and driven rollers 31, 30 and the intermittent feed thereof by the feed mechanisms 60 is absorbed by the set of plural dancer rollers 32.

Figure 9:
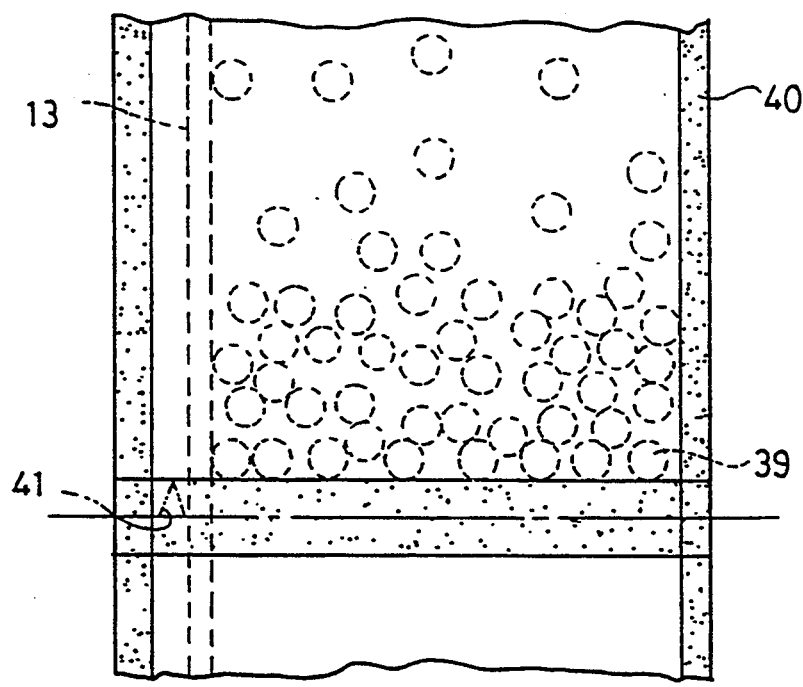
FIG. 9 is a view showing the state where materials to be packed are being filled into the bag.
Figure 10:
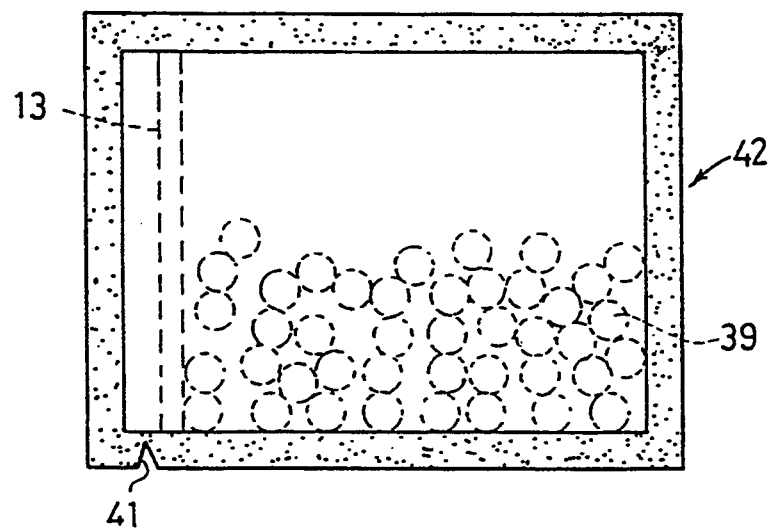
FIG. 10 is a plan view of the bag with a snap zipper after bagging.
Figure 11:
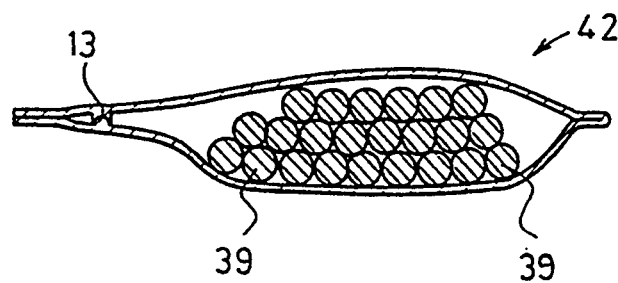
FIG. 11 is a sectional view of the bag with a snap zipper after bagging.

Next, the ultrasonic welder 57 located ahead the distance corresponding to one bag in the downstream side is employed to collapse or crash a portion of the snap zipper corresponding to a widthwise seal, carried out immediately later, under ultrasonic energy. After this process, the tubular film 40 is intermittently transferred in a distance unit of one bag to the pair of sealing bars 38, which is located right below the ultrasonic welder 57 and extends along the width of the tubular film 40, where one widthwise side edge of is sealed (see FIG. 4 which indicates the sealed portion by a dotted line). Simultaneously with sealing of the widthwise side edge, the upper widthwise side edge of the lower region of the tubular film 40, in which the packed material has been bagged, is also sealed off. Also, as soon as such sealing, the desired packed material 39 is automatically supplied into the tubular film 40, now bottom-equipped, from the hopper 45 located above the tubular film 40, resulting in the state as shown in FIG. 9. Thereafter, the tubular film 40 filled with the packed material 39 is intermittently moved over a distance corresponding to one bag, and the opposite widthwise open side edge is sealed off by the sealing bars 38. At the same time, a notch 41 is formed and the tubular film 40 is cut by the cutter 43 in the widthwise direction, with the result the bag 42 with a snap zipper containing the fully packed material 39 is obtained as shown in FIGS. 10 and 11.

The foregoing bag fabricating and filling process according to this embodiment enables to shorten the time required for packing, realize the continuous and automatic process, and hence enhance the packing efficiency. The present apparatus also has the features of relatively simplified construction and small size. In addition, the resulting bag with a snap zipper provides its snap zipper portion having the high hot-melting adhesion to the base film and the stable intermeshing strength.

Figure 12:
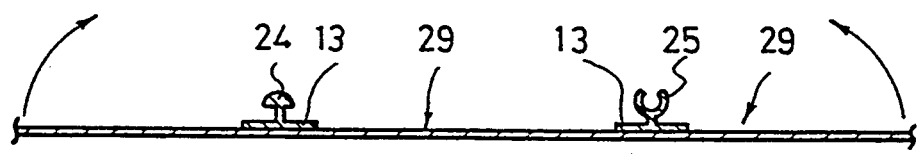
FIGS. 12 to 14 are sectional views showing modifications of the film with a snap zipper before fabricating into the bag.
Figure 13:
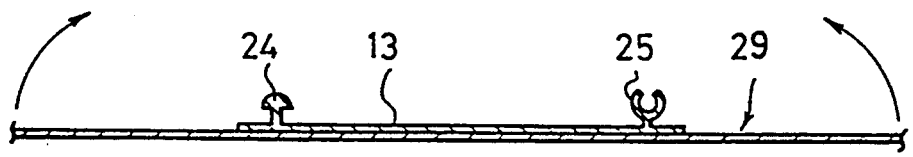
Figure 14:
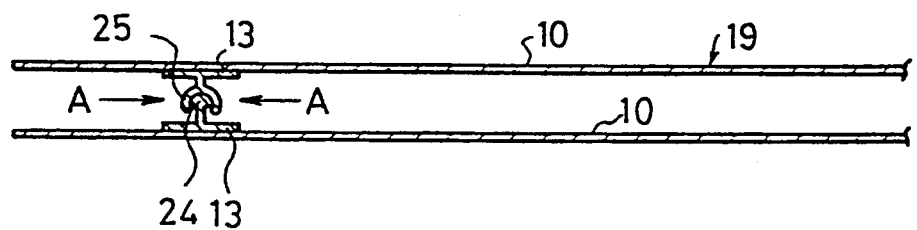

Alternatively, the tubular film 40 may be formed as follows. For example, in the case as shown in FIG. 12, the separate tapes 13 formed with the male portion 24 and the female portion 25, respectively, are arranged relatively close to each other in the vicinity of the widthwise center of the base film 10, and hot-welded to the base film 10 under ultrasonic energy, thereby obtaining the film 29 with a snap zipper. After folding the film 29 about the center line between the male and female portions 24, 25 to fit or intermesh with each other, the open side edge is sealed off to form the tubular film 40. The film 29 with a snap zipper including the male and female portions 24, 25 hot-welded to the base film 10 may instead be obtained, as shown in FIG. 13, by hot-welding a single tape 13 formed with both the male and female portions 24, 25 to the base film 10. As an alternative of this arrangement, it is also possible to prepare the film 29 with a snap zipper and the base film 10 separately, and hot-weld the film 29 with a snap zipper to the opposite end edges of the base film 10 folded about its longitudinal axis, for obtaining the tubular film 40. With another embodiment as shown in FIG. 14, the tapes 13 having the male and female portions 24, 25 intermeshed beforehand with each other are hot-welded to the base film 10 using the ultrasonic welders 17 in a like manner to the foregoing embodiment. Thereafter, the open side edge is sealed off to obtain the tubular film 40. in case of using such tapes 13 with snap zipper half-members, the anvils 18 are located in respective positions indicated by arrows A. In this embodiment, the step of obtaining the film with a snap zipper and the step of forming the tubular film proceeds substantially at the same time.

Figure 15:
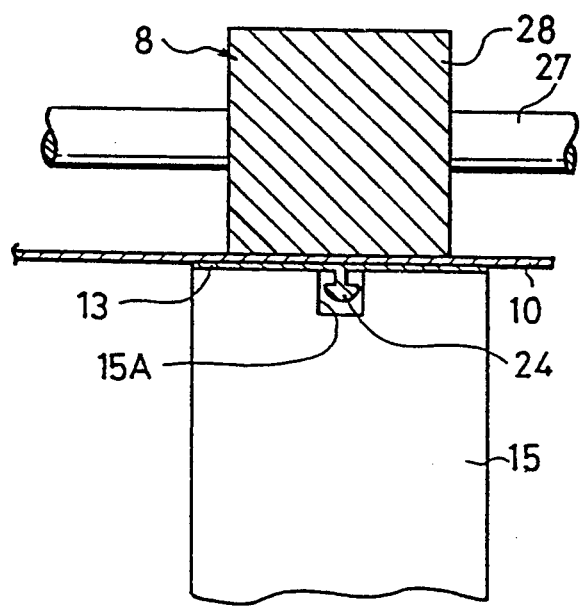
FIG. 15 is a side view, partly in section, showing a modification of arrangement of the ultrasonic welder.

Incidentally, the relative positional arrangement of the ultrasonic welder 17 with respect to the base film 10 and the tapes 13 with snap zipper half-members may be of any desired option. Contrary to the foregoing embodiment, as shown in FIG. 15, it may be arranged such that the tape 13 with a snap zipper half-member locates on the side near the ultrasonic horn 15 and the base film 10 locates on the side near the anvil 18. In this case, as illustrated, a groove 15A is defined in a portion of the horn 15 corresponding to the male portion 24.

Figure 16:
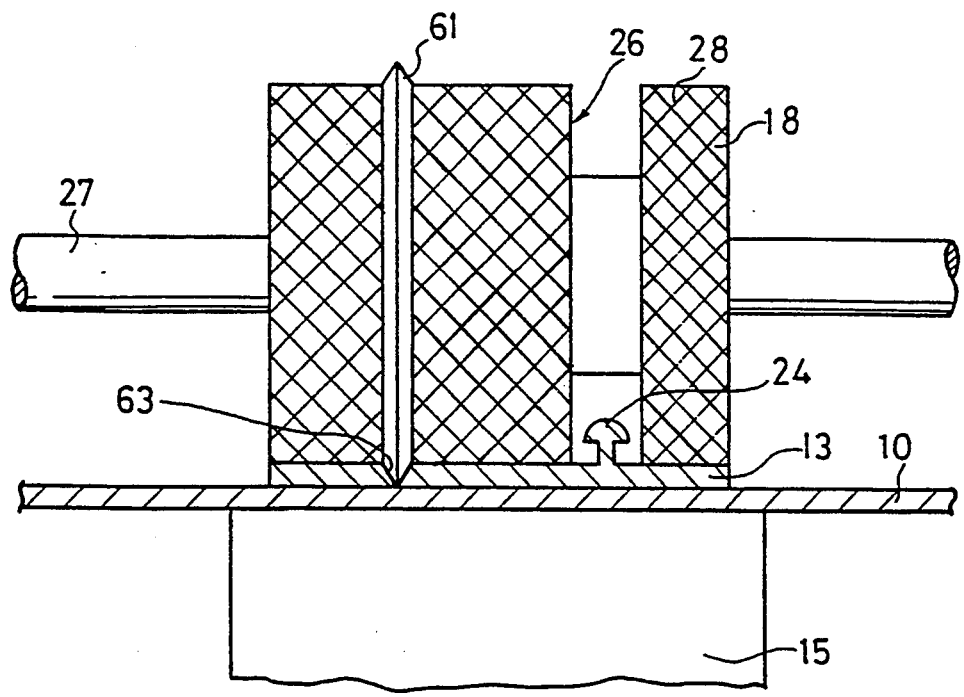
FIG. 16 is a side view showing another embodiment of the ultrasonic welder equipped with a cutter edge.
Figure 17:
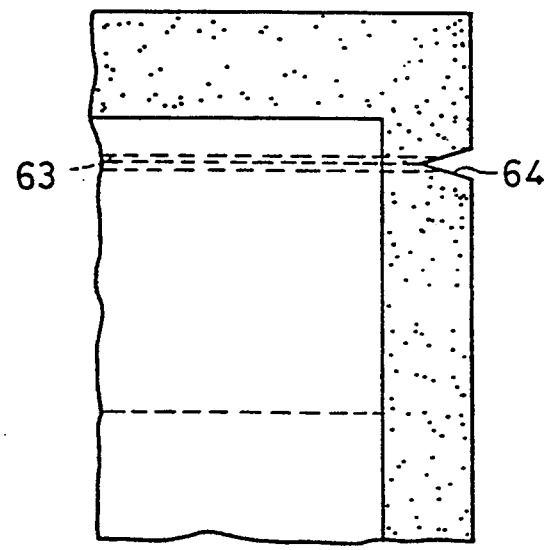
FIG. 17 is a fragmentary plan view of an essential section of the bag fabricated after forming a cut-out line by the cutter edge of FIG. 16.
Figure 18:
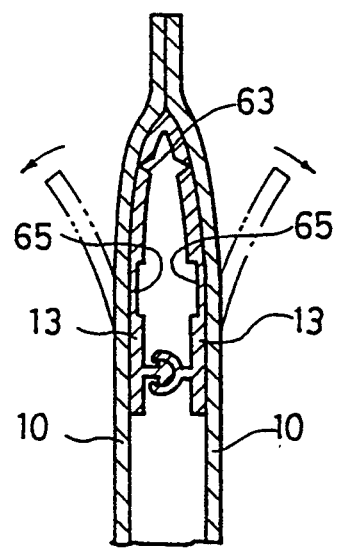
FIG. 18 is a fragmentary sectional view of an essential section showing an embodiment including a notch formed along with the cut-out line.

Further, the anvil 18 may be formed with a cutter edge 61 to present a cut-out line 63 in the tape 13, as shown in FIG. 16. The cutter edge 61 has its height corresponding to the thickness of the tape 13 and is provided integrally with the anvil 18. The shape of the cutter edge 61 may be of any desired design such as V-like, U-like, or trapezoidal form. The cutter edge 61 serves to not only form the cut-out line 63 in a region on the opening side of the tapes 13 with snap zipper half-members, but also form a notch 64 as one side edge of the region in which the cut-out line 63 is formed, as shown in FIG. 17, allowing the bag to be torn with ease. Also, by forming thinner portions 65 in a region on the opening side of the tapes 13 with snap zipper half-members, as shown FIG. 18, there can be resulted the advantage of making it easy to spread the bag after opening. To this end, the projected portions for forming the thinner portions 65 may be provided on the respective anvils 18.

Figure 19:
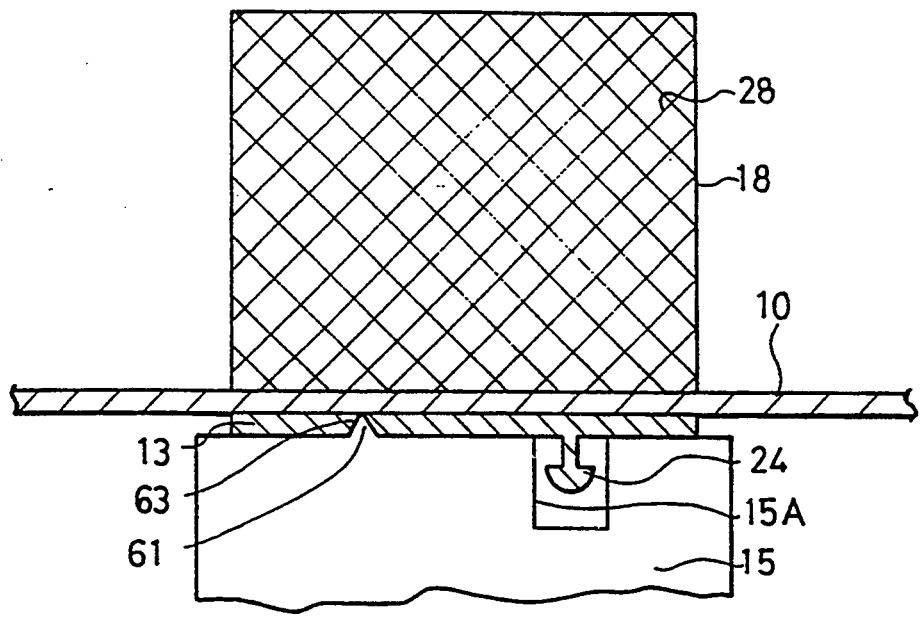
FIG. 19 is a side view showing a modification of FIG. 16.
Figure 20:
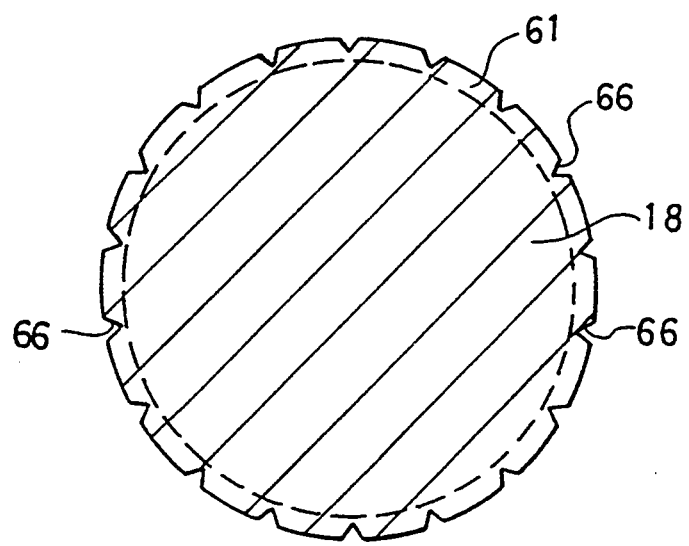
FIG. 20 is a sectional view showing a modification of the cutter edge.
Figure 21:
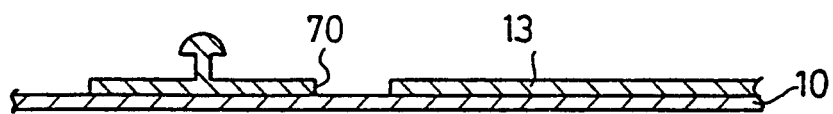
FIGS. 21 and 22 are sectional views showing prior tapes with snap zippers.
Figure 22:
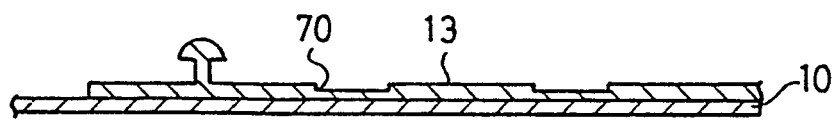

Note that the cutter edge 61 may be provided on the ultrasonic horn 15, as shown in FIG. 19, or a number of slots 66 may be formed in the circumference of the cutter edge 61, as shown in FIG. 20.

With the above arrangement, there can be obtained the bag with a snap zipper which has advantages of, in addition to the above-state ones, allowing the consumer to easily tear open the bag by hands, ensuring the positive airtightness, and providing the steady intermeshing strength and good appearance. Also, no need of special additional steps and means permits to manufacture the bag with a snap zipper at the same cost as before, resulting in the advantage of increased productivity.

Although the foregoing embodiments have been described as having the rotatable anvils 18, they may be arranged to be stationary.

The anvil 18 is not limited to a cylindrical shape. For example, the anvil 18 or the horn 15 may have a surface curved (with the radius of curvature in a range of 1–10 mm) in the direction of running of the film in a region where they contact with each other.

Further, the base film 10 employed in this embodiment can be formed of a single layer film, a multilayered resin film (through coextrusion or lamination), or a laminated film on another substrate (such as metallic foil, cellophane, paper, non-woven fabric, etc.). In particular, an elongated film can also be used because the hot-welding is carried out in a short time of several tenth second and any significant heat effect is not foreseen. Since the present invention utilizes ultrasonic energy to perform the hot-welding operation in a short time while applying the strong hot-melting adhesion, the material of the base film 10 and the tapes 13 with snap zipper half-members may be of common polyethylene, polypropylene or the like, i.e., it can be selected optionally without any limitations. in practice, the automatic bagging and packing process for candies was carried out using tapes with snap zipper half-members formed of polypropylene, a multilayered base film consisted of OPP/CPP, and the apparatus equipped with the ultrasonic welders of 20 KHz and 1800 W was shown in FIGS. 2 and 3.

Moreover, when the material of the tapes 13 with snap zipper half-members and the base film 10 has difficulty in hot welding, this is can be coped by providing the hot-welding portions formed of ionomer resin or random copolymer resin of ethylene - acrylic acid, as mentioned above.

According to the present invention, as fully described above, it becomes possible to provide a snap zipper which has good hot-melting adhesion to the base film, and a bag with a snap zipper, which can be applied to the field of special packing as well. It is also possible to provide manufacture method and apparatus for a bag with a snap zipper, which enable to continuously carry out bonding of the snap zipper with good adhesion, thereby improving the productivity. It is further possible to provide method and apparatus for fabricating and filling a bag with a snap zipper, which enable to enhance the bagging and packing speed.

What is claimed is:

1. A bag with a snap zipper manufactured by hot-welding a snap zipper comprising a pair of intermeshing half members to a base film which comprises a portion of a wall of the bag, said half members having a hot-welded portion formed of a first material selected from the group consisting of an ionomer resin and a random copolymer resin of an ethylene-acrylic acid hot-welded directly to said base film, said base film being formed of a second material which is different from the first material of the hot-welded portion.

2. The bag with a snap zipper according to claim 1, wherein said base film comprises a laminated metallic foil.

3. The bag with a snap zipper according to claim 2, wherein the metallic foil is made of aluminum.

4. The bag with a snap zipper according to claim 1, wherein said first material is an ionomer resin.

5. The bag with a snap zipper according to claim 1, wherein said first material is a random copolymer resin of an ethylene-acrylic acid.

6. The bag with a snap zipper according to claim 1 wherein said random copolymer resin of an ethylene-acrylic acid is selected from the group consisting of ethylene-methacrylic acid random copolymer (EMAA), ethylene-methyl acrylate random copolymer (EMA), ethylene-methyl acrylate random copolymer (EEA), ethylene-methyl methacrylate random copolymer (EMMA), and ethylene-acrylic acid random copolymer (EAA).

7. The bag with a snap zipper according to claim 1, wherein one of said half-members comprises a male portion and wherein another of said half-member comprises a female portion, said male and female portions being capable of meshing to each other, and wherein said half-members include a film on which said male and female portions are formed, the hot-welded portion of said snap zipper being provided on one side of the film remote from the respective male and female portions.

8. The bag with a snap zipper according to claim 7, wherein said film is a multilayered film.

* * * * *